United States Patent [19]

Kimura

[11] Patent Number: 5,038,303

[45] Date of Patent: Aug. 6, 1991

[54] METHOD AND APPARATUS FOR MEASURING TEMPERATURE USING THERMOCOUPLE

[75] Inventor: Hideo Kimura, Kyoto, Japan

[73] Assignee: Yamari Industries, Limited, Osaka, Japan

[21] Appl. No.: 458,193

[22] Filed: Dec. 28, 1989

Related U.S. Application Data

[62] Division of Ser. No. 237,032, Aug. 28, 1988, Pat. No. 4,990,193.

[30] Foreign Application Priority Data

Jun. 24, 1988 [JP] Japan ............................ 63-157471

[51] Int. Cl.$^5$ ................................................ G01K 7/14
[52] U.S. Cl. ................................ 364/557; 364/577;
374/172; 374/179; 374/181; 324/105
[58] Field of Search ............... 364/557, 571.03, 577;
374/172, 178, 179, 180, 181, 182; 324/105

[56] References Cited

U.S. PATENT DOCUMENTS

| | | | |
|---|---|---|---|
| 4,179,745 | 12/1979 | Wuertele | 364/557 |
| 4,403,296 | 9/1983 | Prosky | 364/557 |
| 4,466,749 | 8/1984 | Cunningham et al. | 364/557 |
| 4,588,308 | 5/1986 | Saito | 364/557 |
| 4,715,003 | 12/1987 | Keller et al. | 364/571.03 |
| 4,901,257 | 2/1990 | Chang et al. | 364/557 |
| 4,901,258 | 2/1990 | Akiyama | 364/577 |

Primary Examiner—Parshotam S. Lall
Assistant Examiner—Brian M. Mattson
Attorney, Agent, or Firm—Armstrong, Nikaido, Marmelstein, Kubovcik & Murray

[57] ABSTRACT

A method and apparatus accurately measures temperature even if a temperature difference exists between cold junctions of the main thermocouple. An auxiliary thermocouple is connected to one leg of the main thermocouple to provide cold junction compensation. Extension leads are connected to both cold junctions to take thermo emf from the thermocouple. The leads are made from a material having a thermoelectromotive characteristic in agreement with the thermoelectromotive characteristic of the other leg at low temperatures at which the cold junction compensation is provided. A converter converts the thermo emf of the composite thermocouple into temperature. The converter can separately set interpolations for converting the thermo emf of the auxiliary thermocouple into thermo emf of the main thermocouple and for coverting the sum of the converted thermo emf and the thermo emf of the main thermocouple into temperature.

3 Claims, 12 Drawing Sheets

Fig. 5(iii)
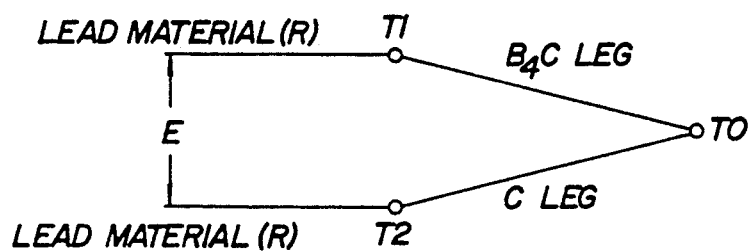

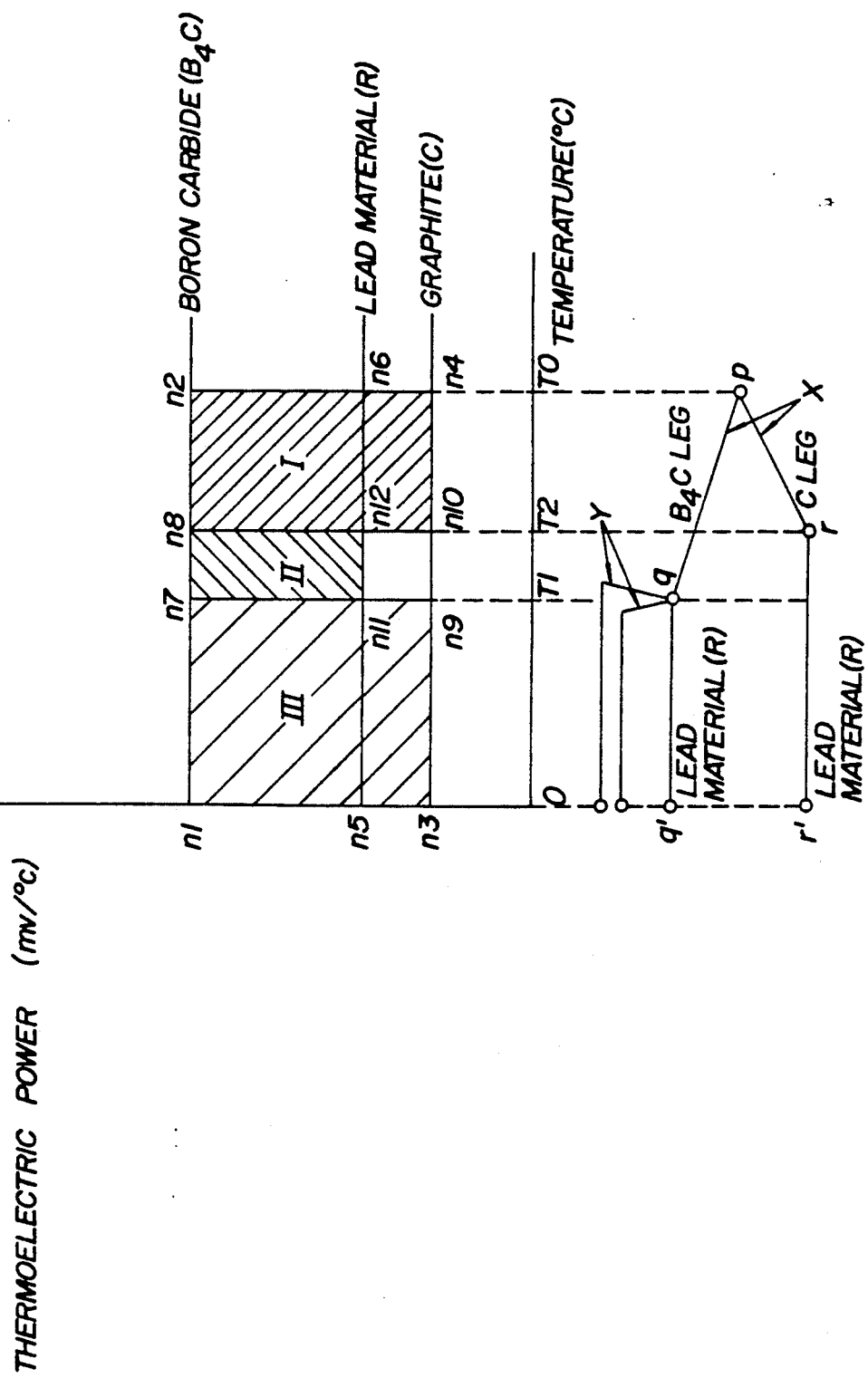

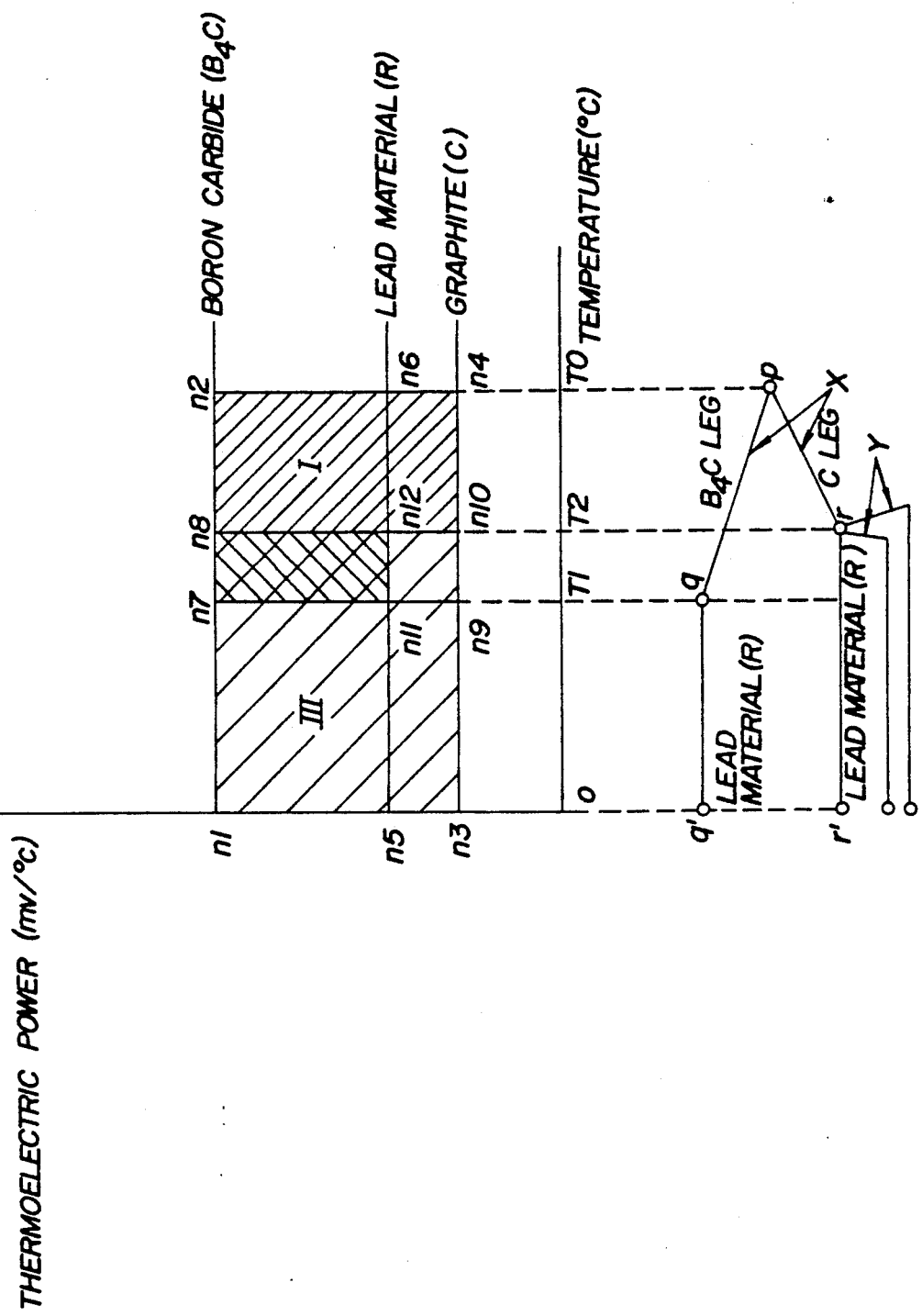

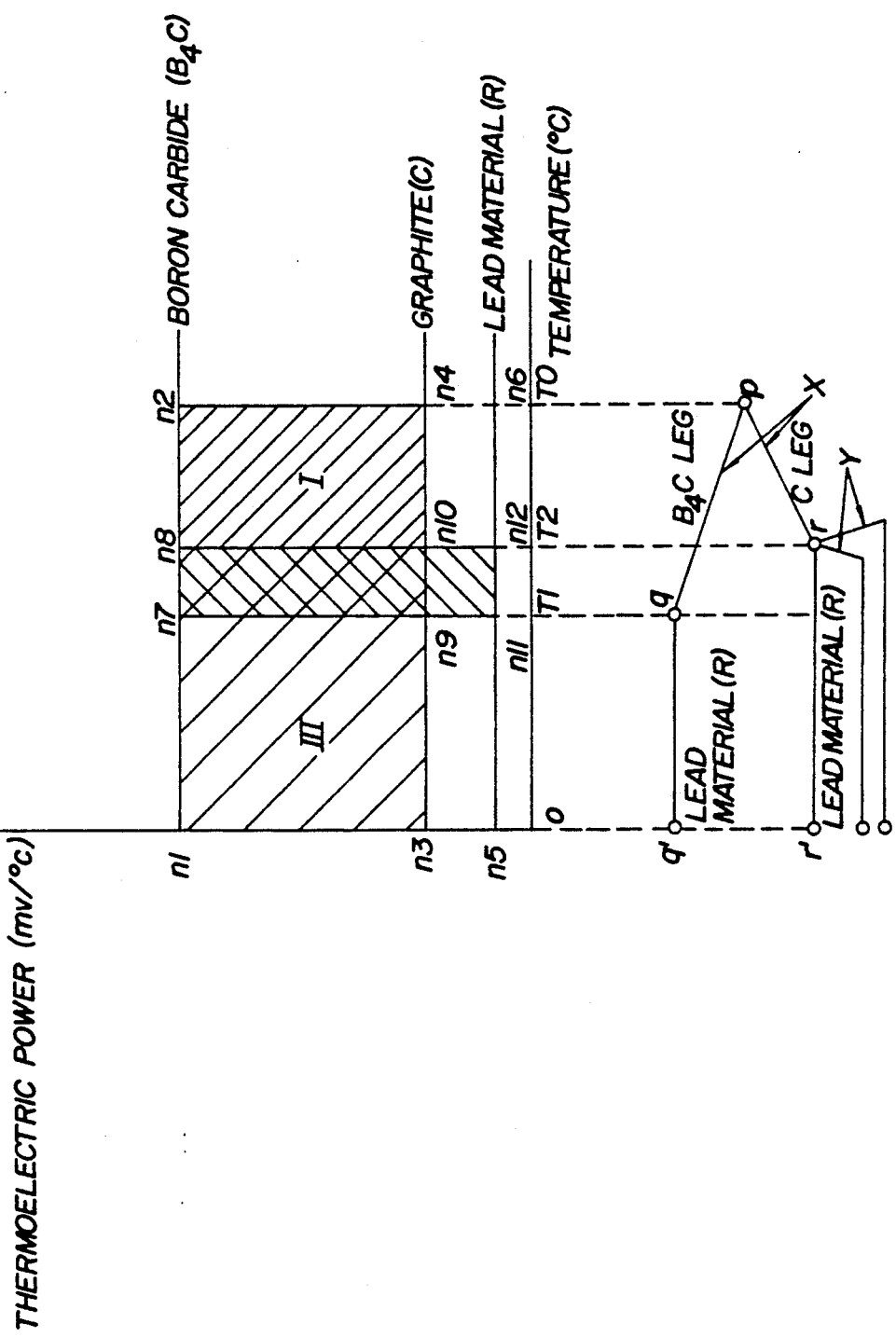

METHOD AND APPARATUS FOR MEASURING TEMPERATURE USING THERMOCOUPLE

This is a division of application Ser. No. 237,032 filed Aug. 25, 1988 now U.S. Pat. No. 4,990,193.

BACKGROUND OF THE INVENTION

1. Field of the Invention

The present invention relates to a method of measuring temperature using a thermocouple, such as a ceramic thermocouple, both cold junctions, of which cannot be maintained at the same temperature, in cases where no compensating lead wires exist for the thermocouple or where, if any compensating lead wire for the thermocouple exists, it is difficult to manufacture for technical or economical reasons.

2. Description of the Prior Art

The relationship between the fundamental structure of a thermocouple and the thermoelectromotive force measured by the thermocouple is conceptually illustrated in FIG. 1. The thermocouple, indicated by X, comprises two dissimilar metals A and B joined at each end to form a hot junction P. The other ends of the metals A and B are maintained at 0° C. or room temperature to form cold junctions q and r. In the illustrated example, these ends of the metals are kept at 0° C. When the hot junction P is located on or in a material being tested, a thermoelectromotive force is developed between the cold junctions q and r. This force is measured to determine temperature.

The graph of FIG. 1 conceptually illustrates the thermo emf produced between the cold junctions q and r of the thermocouple X of the aforementioned structure. The thermoelectromotive power (in mV/°C.), i.e. the rate of change with temperature of the thermo emf of the thermocouple, is plotted against the Centigrade scale. The temperature of the hot junction P is $T_0$. The thermo emf is given by the product of the difference in thermoelectromotive power between the two wires of the thermocouple and the temperature. As an example, the thermo emf produced between the hot junction retained at $T_0$ ° C. and the cold junctions maintained at 0° C. corresponds to the area of the portion of the graph which is delineated by the thermoelectromotive characteristic lines of the two metals of the thermocouple within the temperature range from 0° to $T_0$ ° C. The thermoelectromotive characteristic is uniquely defined by the characteristic of the thermoelectric power. Therefore, if the two metals have the same thermoelectric power characteristic, then they have the same thermoelectromotive characteristic. The thermoelectric power characteristics (FIG. 1) of the two metals A and B were measured with calibrating thermocouples, each having a wire of platinum as its single metal, as shown in FIG. 2.

In FIG. 1, the thermo emf produced by the thermocouple X is denoted by the rectangular hatched region $n_1 n_2 n_4 n_3$ delineated by the thermoelectromotive power characteristic lines of the metals A and B, as mentioned previously.

FIG. 3 illustrates a method adopted in cases where the hot junction P is remote from a measuring instrument or where long metal wires coupled together to form a thermocouple are difficult to manufacture for technical or economical reasons. Compensating lead wires A' and B' are connected with the cold junctions q and r, respectively, of the thermocouple X. The wires A' and B' are made from dissimilar materials having thermoelectromotive characteristics agreeing with the thermoelectromotive characteristics of the two metals A and B at low temperatures. The thermo emf measured between the open ends q' and r' of the compensating lead wires A' and B', respectively, corresponds to the area of the portion $n_1 n_2 n_4 n_3$. In this example, the temperature of the hot junction P of the thermocouple X is $T_0$. The cold junctions q and r are at the same temperature of $T_1$. Therefore, the thermo emf directly generated by the thermocouple X corresponds to the area of the portion which is delineated by the thermoelectromotive characteristic lines of the two metals A and B in the temperature range from $T_0$ to $T_1$, i.e. the portion $n_5 n_2 n_4 n_6$. The thermo emf corresponding to the remaining portion $n_1 n_5 n_6 n_3$ is compensated by the compensating lead wires A' and B'. Since the thermoelectromotive power characteristics of the wires A' and B' agree with the thermoelectromotive power characteristics of the two metals A and B at low temperatures, the connection of the lead wires A' and B' with the metals A and B produces no further thermo emf. Hence, the temperature of the hot junction can be measured precisely.

As shown in FIG. 4, compensating lead wires are not connected with the cold junctions q and r of the thermocouple X, but an auxiliary thermocouple Y consisting of metals is coupled to either the cold junction q or r to provide cold junction compensation. Because the cold junctions q and r are at the same temperature, the auxiliary thermocouple Y can be connected to any of the cold junctions q and r. The auxiliary thermocouple Y acts as a means for connecting a measuring instrument to the cold junction q or r, but it develops no thermo emf. The two wires R of the auxiliary thermocouple are made from the same material. In this case, the thermo emf to be measured corresponds to the area of the portion $n_1 n_2 n_4 n_3$. This portion is divided into a region $n_5 n_2 n_4 n_6$ and a region $n_1 n_5 n_6 n_3$ at a temperature of $T_1$. The thermo emf corresponding to the area of the region $n_5 n_2 n_4 n_6$ is directly measured by the thermocouple X. With respect to the remaining region $n_1 n_5 n_6 n_3$, cold junction compensation is provided by the auxiliary thermocouple Y. The temperature of the hot junction of the main thermocouple X is the sum of the temperature measured by the main thermocouple X and the temperature of the hot junction of the auxiliary thermocouple Y measured by the auxiliary thermocouple Y. The conventional thermocouples have been summarized thus far. These devices are used primarily to measure the temperatures of materials lower than 2000° C.

In recent years, the industry required the measurement of higher temperatures used in heat treatment, such as, HIP and hot pressing. Presently, there is a demand for a thermocouple capable of measuring high temperatures exceeding 2000° C. A tungsten/tungsten-rhenium thermocouple and other thermocouples have been made available to measure such very high temperatures. However, these conventional thermocouples are low in mechanical rigidity and so they easily break. Also, the operation suffers from instability because of thermo emf drift. Further, they have a fundamental disadvantage in that they cannot be used in a stable manner over a long period of time due to metallurgical problems. In an attempt to solve these problems, thermocouples consisting of combinations of semiconductor ceramics, such as $B_4C/C$ (graphite), C (graphite)/$ZrB_2$, and C (graphite)/TiC, which are stable at high temperatures were fabricated in 1950s, for enabling reliable measurement of temperatures. As a result, excellent ceramic thermocouples have now begun to be commercially available. However, various problems must still be solved to measure high temperatures using ceramic thermocouples as described below.

(1) Since ceramic thermocouples produce larger thermo emfs than the conventional metallic thermocouples, appropriate compensating lead wires for providing cold junction compensation do not exist or, if they exist, they are difficult to manufacture for technical or economical reasons. Consequently, no practically usable compensating lead wires are available.

(2) Therefore, it is necessary to water- or air-cool the cold junctions from which a thermo emf is taken by the use of a cooling equipment. Thus, the temperature of the cold junction is made uniform, and the cold junctions are temperature-compensated.

(3) Since constraints are imposed on the manufacture, long ceramic thermocouples cannot be fabricated. This forces the use of short ceramic thermocouples. Where such a short ceramic thermocouple is used while subjecting the cold junctions to forced cooling, the cooling action of water- or air-cooling reaches the hot junction, since the two elements of the thermocouple are short. The temperature of the hot junction may be rendered lower than the temperature of the material being tested. The result is that an error is introduced to the measured temperature. Also, where the cold junctions are subjected to forced cooling, a temperature difference is produced between the cold junctions because the two elements of the thermocouple differ in heat capacity and thermal conductivity. As a result, the measured temperature has an error.

In addition, ceramic thermocouples differ greatly in thermoelectromotive characteristic and, therefore, when the obtained thermal emfs are converted into temperature, compensations should be made taking the characteristics of individual ceramic thermocouples into account. However, a converter is not found which can appropriately establish translation tables used for conversion of thermo emf into temperature according to each individual ceramic thermocouple.

SUMMARY OF THE INVENTION

It is a first object of the invention to provide a method of accurately measuring temperatures, especially high temperatures, using a ceramic thermocouple in cases where no compensating lead wires exist for the thermocouple or where, if any compensating lead wire exists, it is difficult to manufacture.

It is a second object of the invention to provide a ceramic thermocouple which carries out the above-described method.

It is a third object of the invention to provide a converter which converts the thermo emf produced by the ceramic thermocouple described in the preceding paragraph into temperature.

It is yet another object of the invention to provide a converter which converts thermo emf into temperature and can be used with various ceramic thermocouples having different thermoelectromotive characteristics.

The first and second objects are achieved by attaching a metallic thermocouple to one of the cold junctions of a main thermocouple and fabricating lead wires connected to the cold junctions of the main thermocouple from a material having a thermoelectromotive characteristic agreeing with the thermoelectromotive characteristic of the lead wire located opposite to the metallic thermocouple, hereinafter referred to as the auxiliary thermocouple, at low temperatures. The hot junction of the main thermocouple is placed on or in the material being tested. The auxiliary thermocouple is employed to provide cold junction compensation. The lead wires connected to the cold junctions are used to take the thermo emf.

The third object is achieved by a converter which can separately set interpolation equations (1) and (2) to transform thermo emf into temperature and which permits constants defining interpolation equations (1) and (2) to be adequately set according to the characteristics of the used thermocouple. The interpolation equation (1) is used to convert the thermo emf generated by the auxiliary thermocouple into thermo emf of the main thermocouple. The interpolation equation (2) is employed to convert the thermo emf produced by the main thermocouple into temperature.

BRIEF DESCRIPTION OF THE DRAWINGS

FIG. 5($ii$) is a schematic representation of a heating furnace wherein the thermocouple shown in FIG. 5($i$) is inserted, for the purpose of describing the measuring accuracy of the thermocouple;

FIG. 5($iii$) is a schematic representation of the $B_4C/C$ thermocouple shown in FIG. 5($i$), for showing the structure of the thermocouple;

DETAILED DESCRIPTION OF THE PREFERRED EMBODIMENTS

Figure 1:
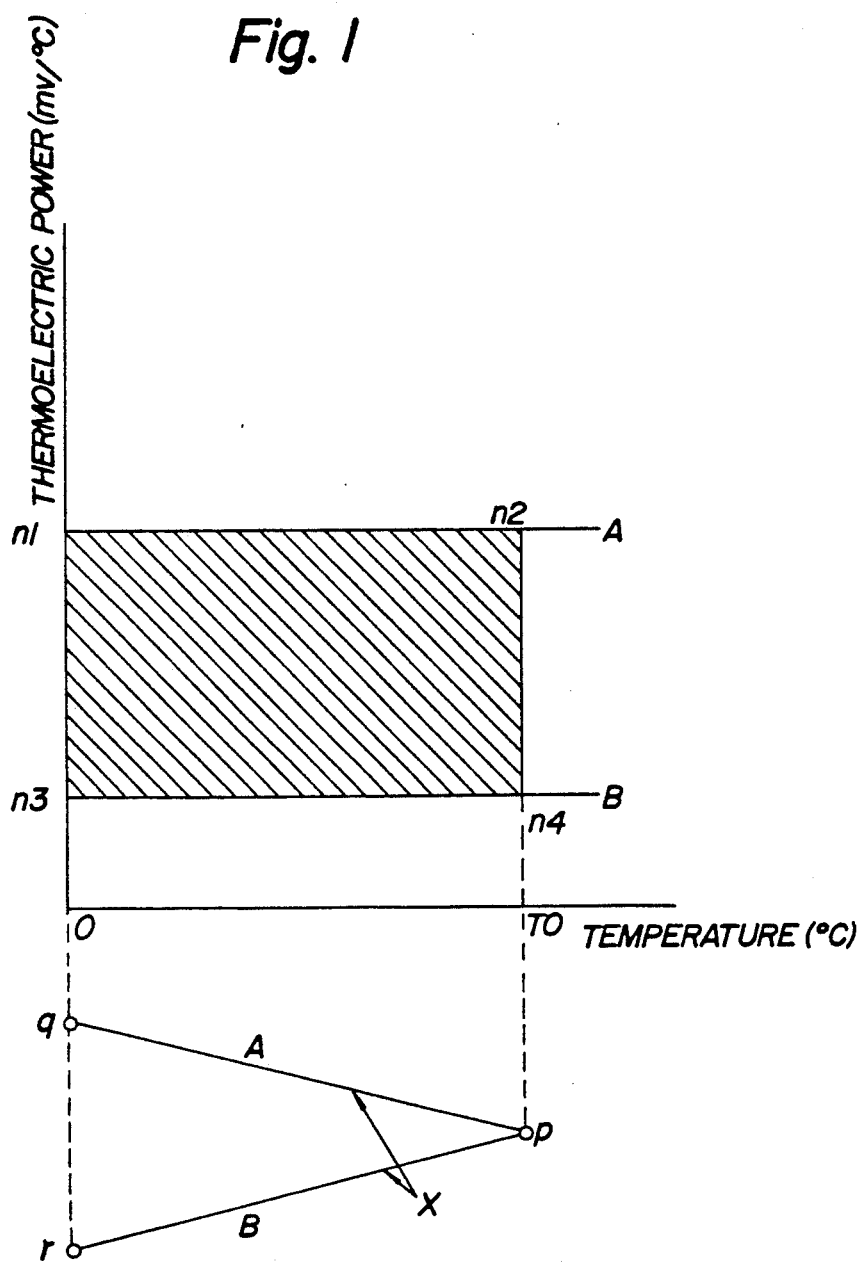
FIG. 1 is a conceptual diagram illustrating the relationship between the structure of a conventional thermocouple and the thermo emf generated by the thermocouple.
Figure 2:
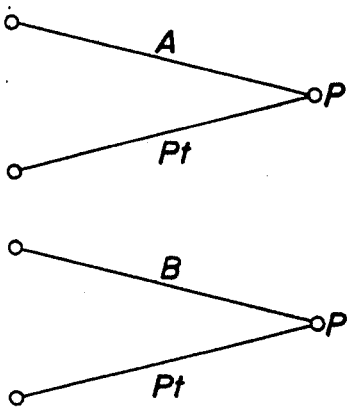
FIG. 2 is a schematic representation illustrating a method of measuring thermoelectric power characteristics.
Figure 3:
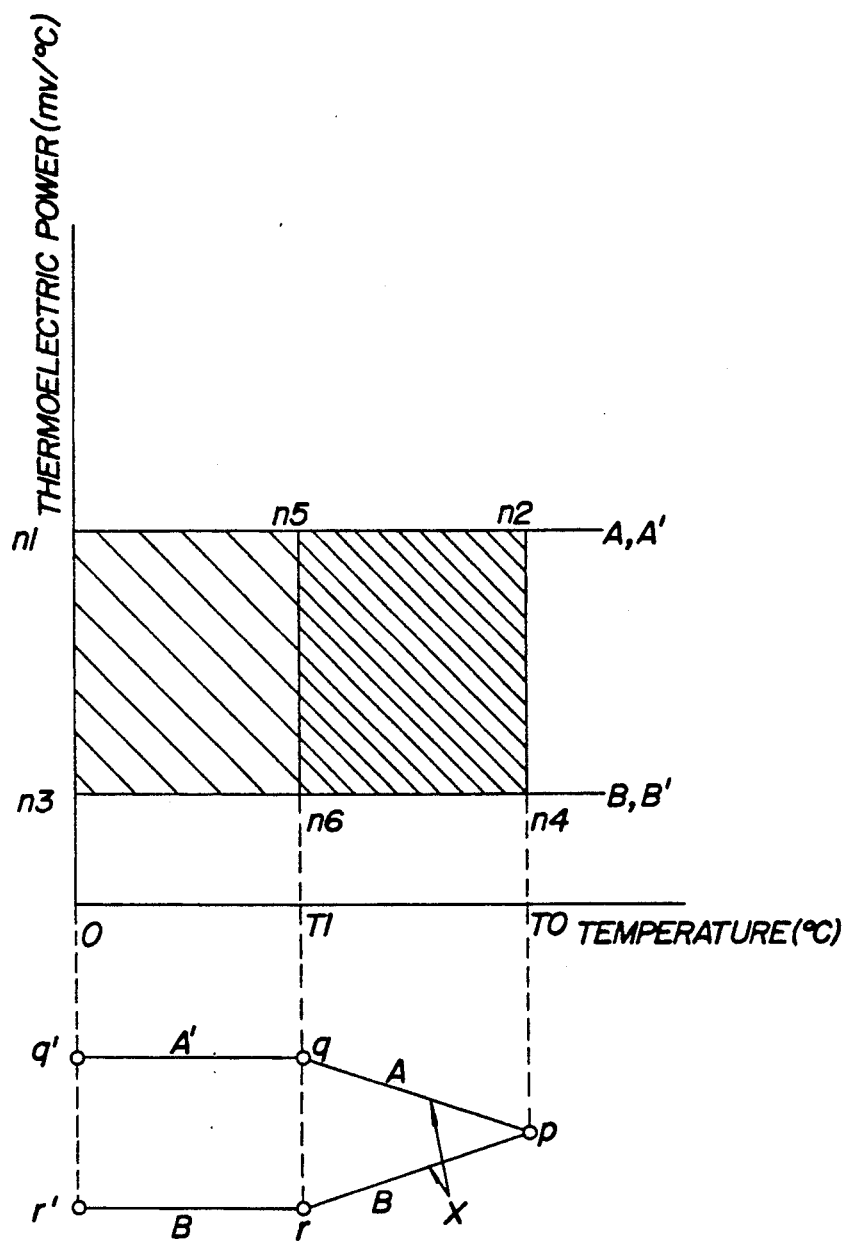
FIG. 3 is a conceptual diagram illustrating the relationship between the structure of a thermocouple using compensating lead wires and the thermo emf generated by the thermocouple.
Figure 4:
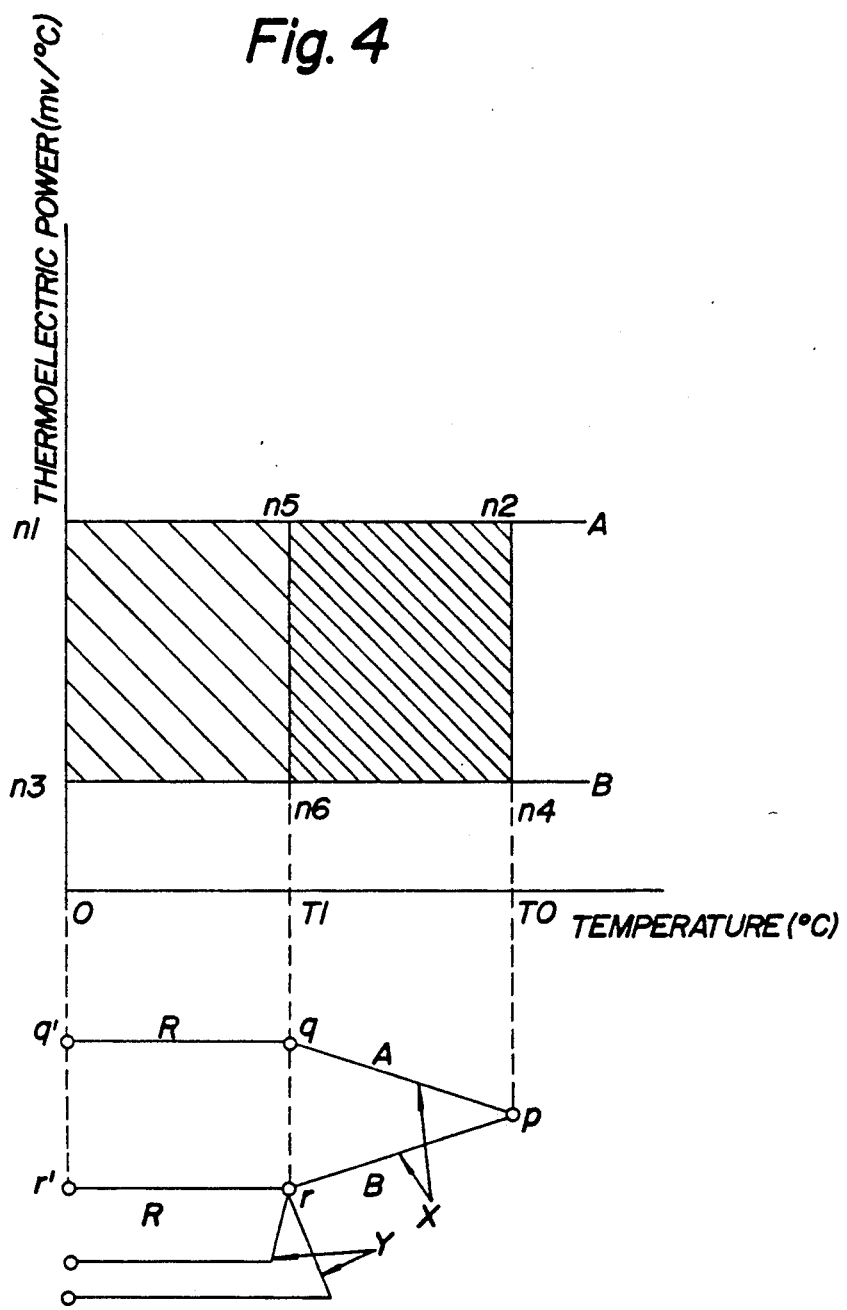
FIG. 4 is a conceptual diagram illustrating the relationship between the structure of a composite thermocouple having one cold junction being compensated by an auxiliary thermocouple and the thermo emf being produced by the composite thermocouple.

Before describing the invention in detail, several terminologies are hereinafter defined now to avoid confusion.

thermoelectric power: The rate of change with temperature of the thermo emf of a thermocouple. Thermo emf is the product of thermoelectric power and temperature. Therefore, the thermoelectric materials which have the same thermoelectric power characteristic are identical in thermoelectromotive characteristic.

main thermocouple: A thermocouple having a hot junction which is located in or on a material being examined. In the body of the specification, it refers to a ceramic thermocouple. In the illustrated examples of the invention, it refers to a B₄C/C thermocouple.

wires of thermocouple: Legs constituting a main thermocouple. In FIGS. 3 and 4, legs of a thermocouple are indicated by A and B. In the illustrated examples of the invention, a leg of boron carbide (B₄C) and a leg of graphite (C) correspond to this definition.

cold junctions: The ends of the wires of the main thermocouple which are at a lower temperature. These contacts are used to take the thermo emf generated by a main thermocouple. Compensating lead wires and extension leads are brought out from these junctions. In FIGS. 3 and 4, q and r indicate cold junctions. In the examples where a B₄C/C thermocouple is used, one end of the leg of B₄C and one end of the leg of graphite are cold junctions.

auxiliary thermocouple: A thermocouple attached to one cold junction of a main thermocouple for providing cold junction compensation. The thermoelectromotive characteristic of the auxiliary thermocouple is known. In the body of the specification, it refers to a metallic thermocouple.

composite thermocouple: A thermocouple consisting of a main thermocouple and an auxiliary thermocouple that compensates for the temperature of one cold junction of the main thermocouple.

compensating lead wires: Lead wires, one of which is connected between one cold junction of a main thermocouple and a measuring instrument, the other wire being connected between the other cold junction and the measuring instrument. The materials of the compensating lead wires have thermoelectromotive characteristics agreeing with the thermoelectromotive characteristics of the wires of the main thermocouple at low temperatures. In FIG. 3, A' and B' indicate compensating lead wires. Therefore, the compensating lead wires A' and B' are made from dissimilar materials.

extension leads: Leads going from both cold junctions of a main thermocouple to a remotely located measuring instrument to electrically connect both cold junctions to the measuring instrument. The extention leads should have small resistance and produce low thermal noise. In FIG. 4, extension leads are denoted by R and made from the same material.

The present invention is applied to thermocouples, such as ceramic thermocouples. That is, it is difficult to make them long. They have no compensating lead wires. Forced cooling is not adequate to cool their cold junctions.

Figure 5I:
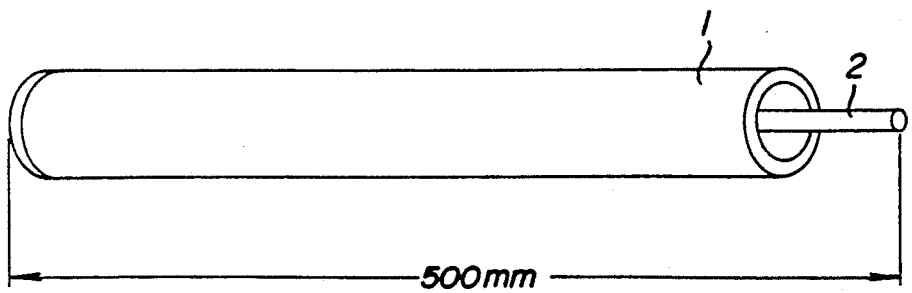
FIG. 5($i$) is a perspective view of a $B_4C/C$ thermocouple.
Figure 5:
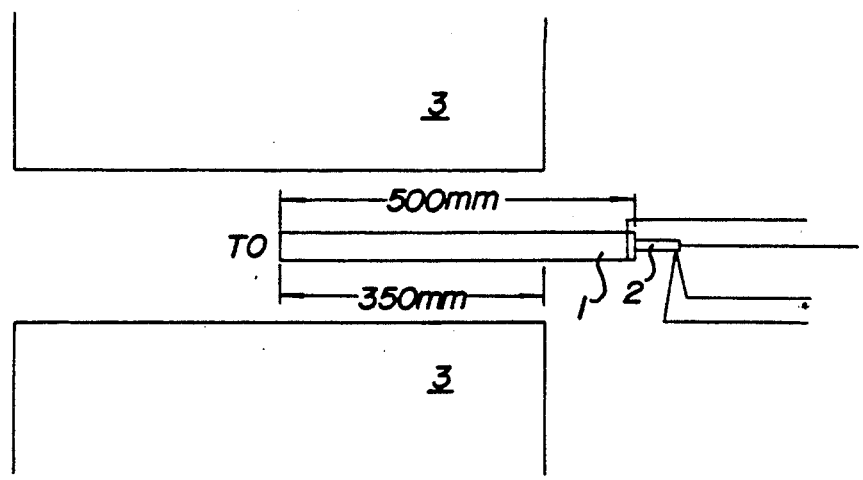

A known thermocouple which can be used under these conditions is shown in FIG. 4, wherein an auxiliary metallic thermocouple Y is connected to one of the cold junctions q and r of a main thermocouple X to provide cold junction compensation. The present inventor conducted experiments to ascertain whether accurate measurement of high temperatures can be performed by this known method. Referring to FIG. 5(i), a rodlike member 2 made from boron carbide (B₄C) was inserted into a cylindrical member 1 made from graphite (C). Both members were joined together at their front ends to form a main ceramic thermocouple having a hot junction P. The total length of the main thermocouple was 500 mm. An auxiliary thermocouple Y was connected to the leg of B₄C of the main thermocouple to form a composite thermocouple. As shown in FIG. 5(ii), the composite thermocouple was inserted 350 mm into a heating furnace 3. The temperature inside the furnace was measured several times under the same conditions. The temperature inside the furnace was increased up to 2000° C. It was found that the results of the measurements varied considerably and involed glaring errors in spite of the fact that the measurements were performed under the same conditions. The present inventor earnestly investigated the cause and succeeded in finding it out.

Figure 6:
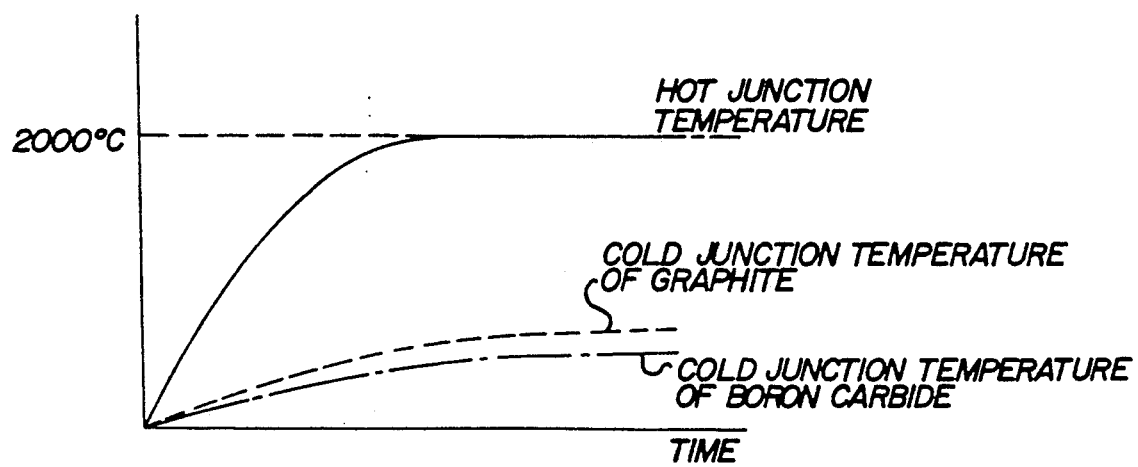
FIG. 6 is a graph showing the changes in the temperature of the hot junction P of the $B_4C/C$ thermocouple shown in FIG. 5($i$) and in the temperature of both cold junctions.

In the method of providing cold junction compensation by an auxiliary thermocouple, it is assumed that both cold junctions q and r are at the same temperature, as already described in connection with FIG. 4. In practice, however, the temperature at the cold junction of graphite (C) is always higher than the temperature at the cold junction of boron carbide (B₄C), as shown in FIG. 6 because B₄C and C differ in heat capacity and thermal conductivity. Consequently, a temperature difference is created between the cold junctions q and r, thus producing an error. Further, the temperature difference varies and so, the measured temperatures do not agree. Hence, the reproducibility is poor.

The manner in which extension leads are connected to the cold junctions of the legs of B₄C and graphite while a temperature difference is produced between the cold junctions is conceptually illustrated in FIG. 7(i). Specifically, in the range from the temperature $T_0$ of the hot junction to the temperature $T_2$ of the cold junction of the graphite leg, the main B₄C/C thermocouple produces a thermo emf. In the range from $T_2$ to $T_1$, a thermo emf is developed between one extension lead R and the leg of B₄C. The sum of these two thermal emfs is set up between the ends of the extension leads between which a measuring instrument is connected. This phenomenon takes place because the temperature at the end q of the leg of B₄C is not identical with the temperature at the end r of the leg of graphite (C), as mentioned previously. If the temperatures of both cold junctions become different according to the measuring environment, then the produced thermo emf E varies although the temperature of the hot junction at the front end is maintained constant. As a result, temperatures are measured with poor reproducibility. Another problem arises from the fact that the obtained thermo emf becomes different, depending on whether the temperature at the cold junction of the leg of $B_4C$ or the temperature at the cold junction of the leg of graphite (C) is used to provide cold junction compensation.

Figure 7:
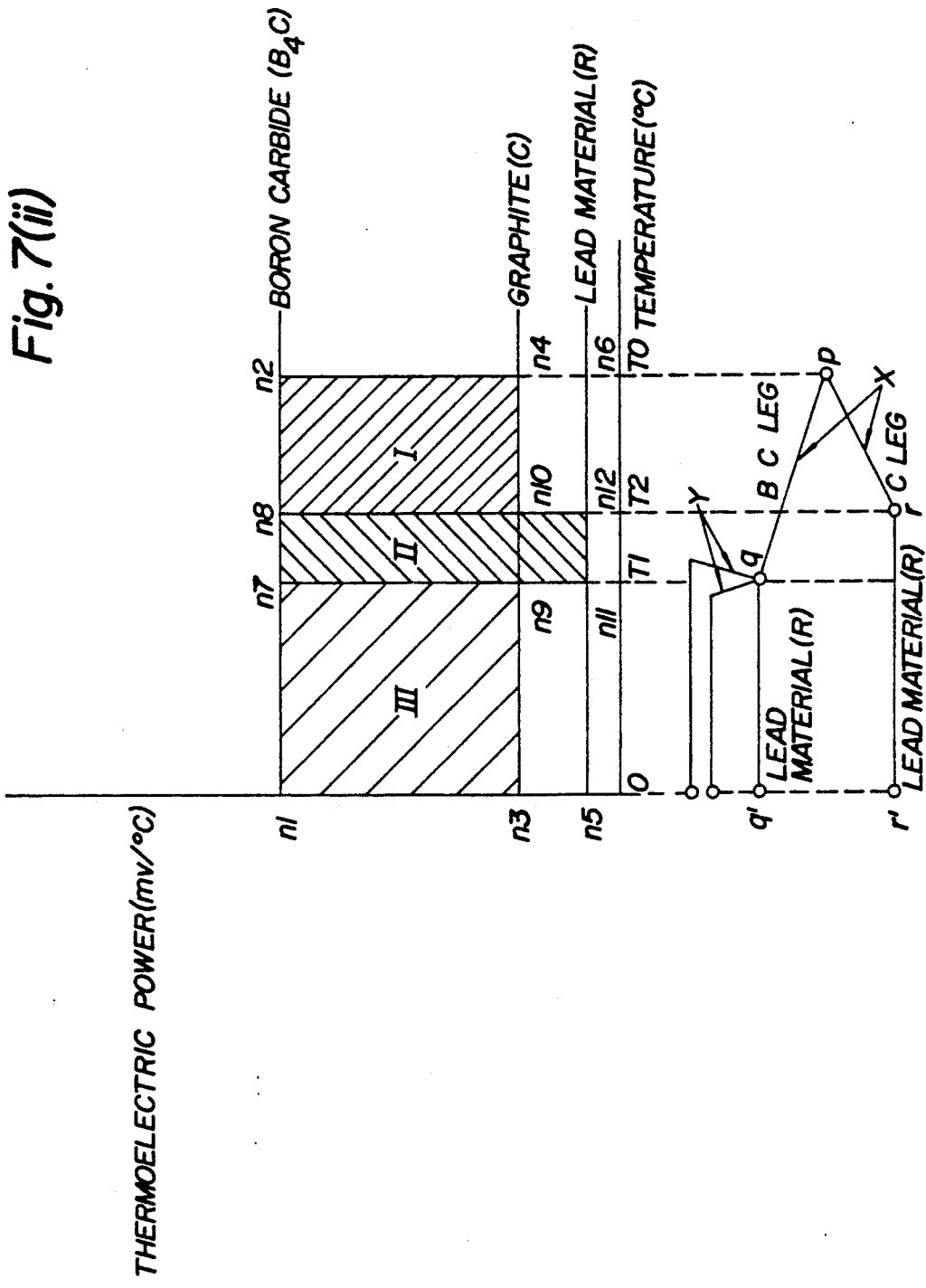
FIGS. 7($i$)–7($iv$) are conceptual diagrams illustrating the principle of the invention.

The aforementioned phenomenon is now discussed further. This condition assumes various aspects depending on the position at which cold junction compensation is made and also on the kind of the extension leads R. These aspects are conceptually illustrated in FIGS. 7(i)-7(iv). FIGS. 7(i) and 7(ii) show cases where the cold junction of the leg of boron carbide ($B_4C$) is compensated using the auxiliary thermocouple Y. FIGS. 7(iii) and 7(iv) show cases where the cold junction at the end of the leg of graphite is compensated. In these cases, the straight lines show the thermoelectric power characteristics of the $B_4C$ leg and the graphite leg of the thermocouple X. Platinum (Pt) is used as a reference material. Extension leads R are connected to the cold junctions q and r of the legs of boron carbide ($B_4C$) and graphite, respectively. Let $T_0$, $T_2$, and $T_1$ be the temperature of the hot junction, the temperature of the cold junction r of the graphite leg, and the temperature of the cold junction q of the $B_4C$ leg, respectively. Since the cold junction of the leg of graphite is always higher in temperature than the cold junction of the leg of $B_4C$, the relationship $T_2 > T_1$ holds.

In FIGS. 7(i)-7(iv), a correct thermo emf corresponding to the temperature $T_0$ of the hot junction corresponds to the region $n_1n_2n_4n_3$ which is delineated by the thermoelectric power characteristic lines of the legs of $B_4C$ and graphite within the temperature range from 0 to $T_0$. In any of the cases shown in FIGS. 7(i)-7(iv), the thermo emf produced at temperatures higher than $T_2$ is given by region I, or $n_8n_2n_4n_{10}$, and generated by the $B_4C$ leg and the graphite leg. Therefore, no problems occur.

However, the thermo emf produced at temperatures lower than $T_2$ poses problems. For instance, if junction compensation is provided at the cold junction of the leg of $B_4C$, then measured temperatures lower than the temperature $T_1$ of the cold junction of the $B_4C$ leg are correctly compensated by the thermo emf (region III, or $n_1n_7n_9n_3$) produced by the auxiliary thermocouple Y. On the other hand, those temperatures which are in excess of $T_1$ and lower than $T_2$ are compensated by the thermo emf (region II, or $n_7n_8n_{12}n_{11}$) generated between the leg of $B_4C$ and one extension lead R. Since the magnitude of this thermo emf (II) depends on the thermoelectric power characteristic of the extension lead R, the magnitude corresponds to the area of the region which is delineated by the thermoelectric power characteristic lines of the leg of $B_4C$ and the extension lead R within the temperature range from $T_1$ to $T_2$. Therefore, where the thermoelectric power characteristic line of the extension lead R lies between the thermoelectric power characteristic line of the leg of $B_4C$ and the thermoelectric power characteristic line of the leg of graphite, as shown in FIG. 7(i), the thermo emf (II) produced between the leg of $B_4C$ and the extension lead R corresponds to the region $n_7n_8n_{12}n_{11}$. In this temperature range, the thermo emf given by the region $n_7n_8n_{10}n_9$ should be measured and so the measured value is smaller than the correct value by an amount expressed by the region $n_{11}n_{12}n_{10}n_9$. Since the area of this region $n_{11}n_{12}n_{10}n_9$ representing the deficiency increases or decreases as the temperatures $T_1$ and $T_2$ change, no correction can be made unless the changes in the temperatures $T_1$ and $T_2$ can be forecasted. As can be seen from the graph, the deficiency increases as the distance between the thermoelectric power characteristic line of the extension lead R and the thermoelectric power characteristic line of the graphite leg increases.

Where the thermoelectric power characteristic line of the extension lead R lies below the thermoelectric power characteristic line of the leg of graphite (C), as shown in FIG. 7(ii), the thermo emf (II) produced by the leg of $B_4C$ and the extension lead R in the temperature range from $T_1$ to $T_2$ is given by the region $n_7n_8n_{12}n_{11}$. This region is broader by the region $n_9n_{10}n_{12}n_{11}$ than the region $n_7n_8n_{10}n_9$ expressing the thermo emf that should be measured in this temperature range. In the composite thermocouple which compensates for the temperature of the cold junction of the $B_4C$ leg using the metal thermocouple Y in this way, the area of the region surrounded by the thermoelectric power characteristic lines of the extension lead R and the leg of graphite in the temperature range of $T_2$ to $T_1$ corresponds to the magnitude of error contained in the measurement. As the temperatures $T_1$ and $T_2$ vary, this magnitude increases or decreases.

A discussion is hereinafter made of cases where the metal thermocouple Y is connected to the cold junction of the graphite leg of the main thermocouple X to compensate for the temperature of the cold junction of the graphite leg, as shown in FIGS. 7(iii) and 7(iv). The thermo emf produced in the temperature range of $T_0$ to $T_2$ is measured as the thermo emf (region I, or $n_8n_2n_4n_{10}$) generated between the leg of $B_4C$ and the leg of graphite of the main thermocouple, whether the thermoelectric power characteristic line of the extension lead R lies between the thermoelectric power characteristic line of the leg of graphite and the thermoelectric power characteristic line of the leg of $B_4C$, as shown in FIG. 7(iii) or above the thermoelectric power characteristic line of the leg of graphite, as shown in FIG. 7(iv). Although the compensation is provided by the thermo emf (region III, or $n_1n_8n_{10}n_3$) produced by the auxiliary thermocouple Y in the temperature range lower than $T_2$, thermo emf is also set up between the leg of $B_4C$ and the extension lead R in the temperature range from $T_1$ to $T_2$. The latter emf is added to the former emf given by the region III. The magnitude of the added emf is expressed by the region $n_7n_8n_{12}n_{11}$ in FIG. 7(iii) and the region $n_7n_8n_{12}n_{11}$ in FIG. 7(iv). Because of the added emf, the thermo emf measured by the measuring instrument is larger than the correct value given by the region $n_1n_2n_4n_3$.

To summarize the results of the discussion made thus far, the conceivable causes of errors contained in the measurement made by the composite thermocouple when the temperature $T_1$ of the cold junction of the $B_4C$ leg and the temperature $T_2$ of the graphite leg vary are as follows.

(1) Where cold junction compensation is provided at the end of the leg of $B_4C$, the thermo emf given by the area of the region delineated by the thermoelectric characteristic lines of the extension lead R and the leg of graphite (C) within the temperature range from $T_1$ to $T_2$ causes an error.

(2) Where cold junction compensation is provided at the end of the graphite leg, the thermo emf corresponding to the area of the region delineated by the thermoelectric power characteristic lines of the extension lead and the $B_4C$ leg in the temperature range of $T_1$ to $T_2$ brings about an error.

The following conclusion from the foregoing items (1) and (2), are noted as follows: "The thermo emf corresponding to the area of the region delineated by the thermoelectric power characteristic line of the leg disposed opposite to the compensated cold junction and also by the thermoelectric power characteristic line of the extension leads in the temperature range from $T_1$ to $T_2$ causes an error." From this conclusion, a method is provided for measuring temperatures essentially without error even if the temperatures $T_1$ and $T_2$ of the cold junctions vary.

This method consists in making the thermoelectromotive characteristic of the extension leads coincident with the thermoelectromotive characteristic of the uncompensated leg in order to prevent the thermo emf produced between the extension leads and the thermocouple legs from including an error.

Specifically, this invention pertains to a composite thermocouple which has no compensating lead wire and both junctions of which cannot be maintained at the same temperature. The temperature of one cold junction is compensated by an auxiliary thermocouple. This composite thermocouple is characterized in that extension leads for taking thermo emf are made from a material having a thermoelectromotive characteristic agreeing with the thermoelectromotive characteristic of the leg to which the auxiliary thermocouple is not connected, at low temperatures.

In other words, compensating lead wires coinciding in thermoelectromotive characteristic with their respective legs of the novel thermocouple are not simultaneously available. If an extension lead having a thermoelectromotive characteristic approximating the thermoelectromotive characteristic of one leg of the thermocouple can be employed, then this leg is used to take the thermo emf produced by the thermocouple. An auxiliary thermocouple is attached to the other leg to provide cold junction compensation. Thus, temperatures can be accurately measured without error.

Figure 8:
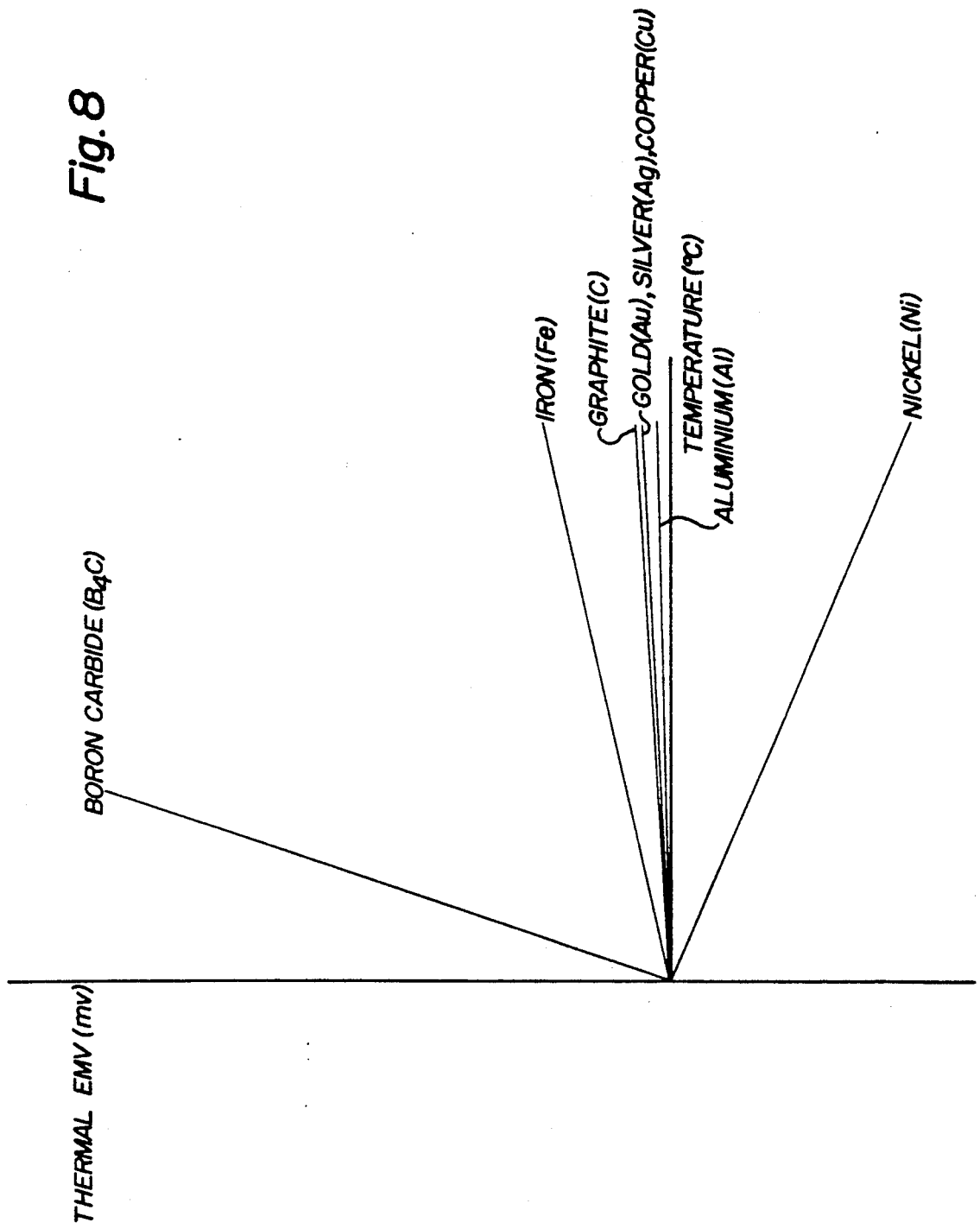
FIG. 8 is a graph showing the results of measurements of the thermoelectromotive characteristics of various metal materials to select materials for extension leads.

In order to execute the above-described method, the present inventor measured the thermoelectromotive characteristics of various materials, for determining the materials from which extension leads for a $B_4C/C$ thermocouple can be fabricated. The series of measurements was carried out by using the characteristic of platinum as a reference. The thermoelectromotive characteristics of these materials were compared with those of boron carbide ($B_4C$) and graphite (C). The results are shown in FIG. 8. The tested materials were all metals for the following reason. The extension leads must be flexible and joined to other material. It was thought that one or more of the metallic materials may satisfy these requirements.

As can be understood from the graph of FIG. 8, $B_4C$ produced a very large thermo emf. None of the metallic materials can be comparable to $B_4C$ in this respect. An Fe-Si alloy (not shown) which is used as a thermocouple material, for example, generates a thermo emf close to the thermo emf produced by $B_4C$. However, the Fe-Si alloy has poor flexibility. Further, it cannot be easily formed into thin wires because the alloy consists primarily of sintered materials.

On the other hand, the thermo emf produced by graphite is relatively small. Advantageously, its thermoelectromotive characteristic is close to the thermoelectromotive characteristic of pure copper (Cu) up to about 500° C., the copper being one of the most popular lead materials. Also, graphite almost coincides in thermoelectromotive characteristic with gold (Au), silver (Ag), and other metals. Of these materials, pure copper is comparatively cheap and can be readily machined. Hence, pure copper is the optimum lead material.

Thus, when temperature is measured using a $B_4C/C$ thermocouple, the cold junction at the end of the leg of $B_4C$ is compensated, and extension leads are made from pure copper. In this case, the temperature of the hot junction can be precisely measured no matter what the changes in the temperature are at the cold junction of the leg of $B_4C$ or graphite. In the present example, the concept of the invention is applied to a $B_4C/C$ thermocouple. The novel method can also be applied to other ceramic thermocouples. Since many ceramic thermocouples have one leg made from graphite (C), a very large number of ceramic thermocouples can use extension leads made from pure copper.

Figure 9:
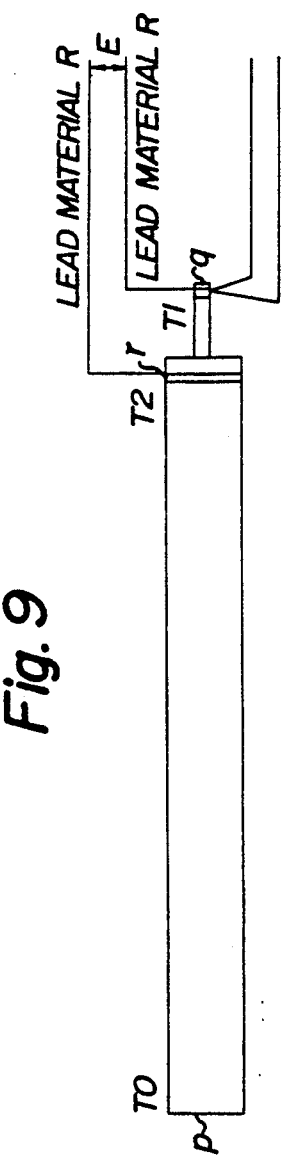
FIG. 9 is a schematic representation of a composite $B_4C/C$ thermocouple manufactured on an experimental basis in accordance with the invention, for demonstrating the advantages of the thermocouple.
Figure 10I:
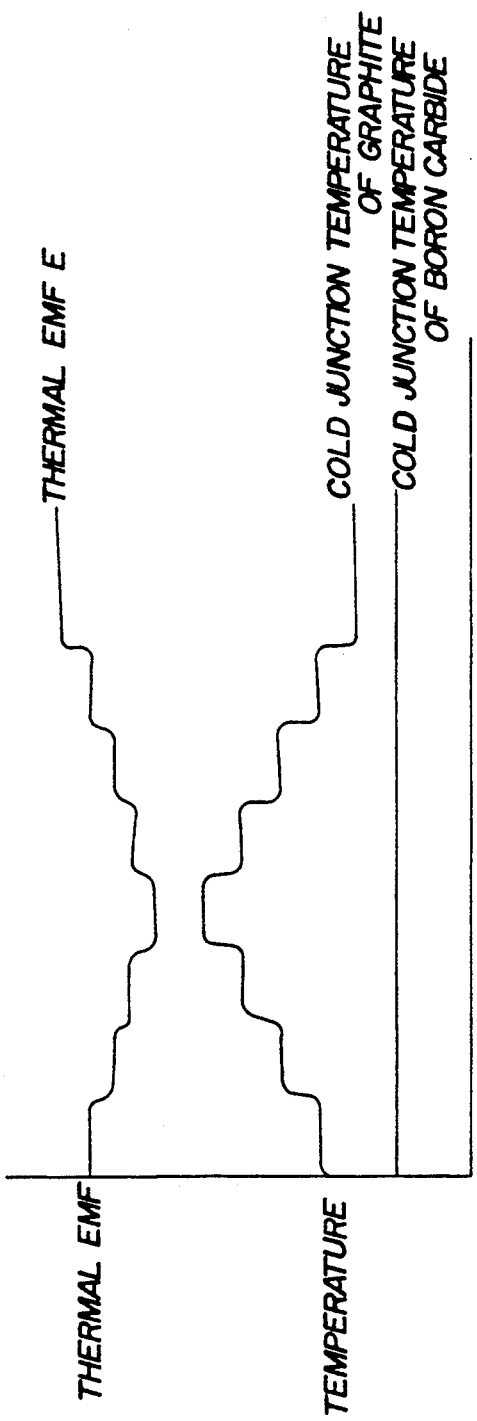
FIGS. 10($i$) and 10($ii$) are graphs showing the results of measurements made to investigate the stability of the composite $B_4C/C$ thermocouple shown in FIG. 9 while varying the temperature at the cold junction of the graphite leg of the thermocouple.
Figure 10:
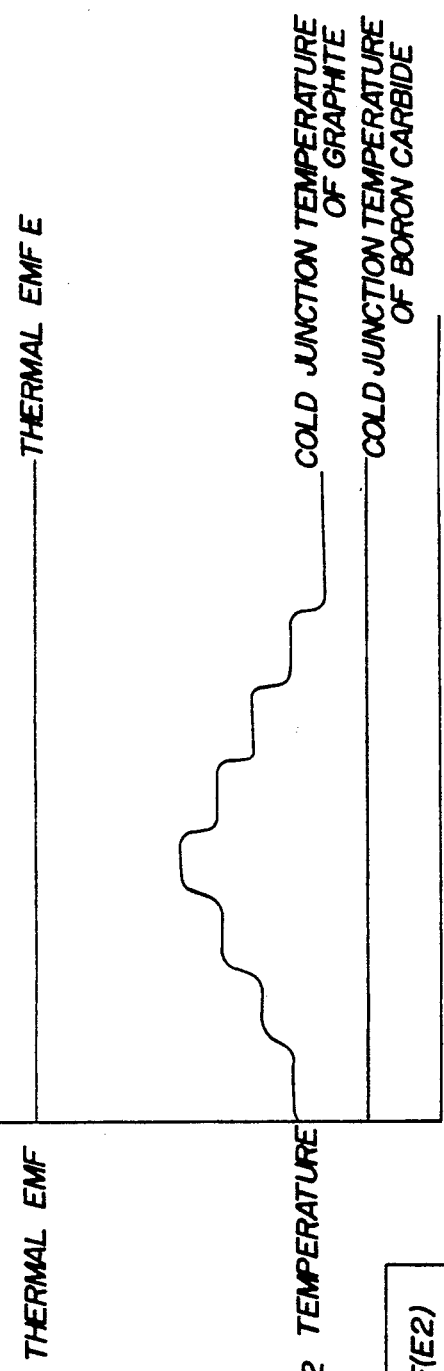

In order to ascertain the effects of the novel method, the present inventor fabricated a $B_4C/C$ thermocouple as shown in FIG. 9. The temperature at the cold juction of the leg of graphite was changed while maintaining the hot junction and the cold junction of the $B_4C$ leg at constant temperatures to create a temperature difference between the end q of the $B_4C$ leg and the end r of the graphite leg. At this time, a thermo emf E was detected between the ends of the extension leads R; i.e. R to evaluate the stability of the output thermo emf. The results are shown in FIGS. 10(i) and 10(ii). FIG. 10(i) shows the case where extension leads made from iron (Fe) were used. FIG. 10(ii) shows the case where extension leads made from pure copper (Cu) were employed. In these experiments, the temperature $T_0$ of the hot junction was retained at 2000° C. The cold junction of the leg of $B_4C$ was cooled with cold water to maintain at a constant temperature. Temperatures expressed in °C. and electromotive force were plotted against time. In the case where extension leads were made from pure copper (Cu), as shown in FIG. 10(ii), the output thermo emf E was maintained substantially constant in spite of the fact that the temperature at the cold junction of the leg of graphite varied. Thus, the emf E was quite stable. The results of the experiments reveal that the temperature of the hot junction can be precisely measured at all times with high reproducibility no matter what the temperature changes are at the cold junction of the $B_4C$ and the graphite leg, by using a $B_4C/C$ thermocouple, employing extension leads made from pure copper, and compensating the cold junction at the end of the $B_4C$ leg with an auxiliary thermocouple.

Figure 11:
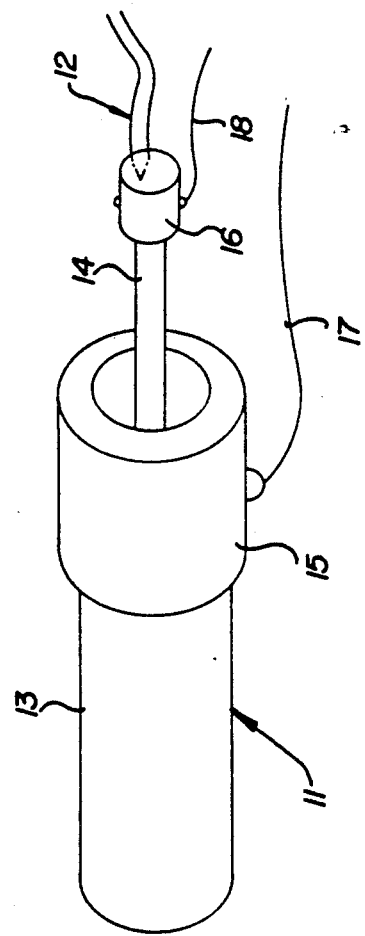
FIG. 11 is a perspective view of main portions of a specific example of a composite B₄C/C thermocouple according to the invention.

Referring next to FIG. 11, there is shown a composite thermocouple according to the present invention. This thermocouple can be exploited industrially, and comprises a ceramic thermocouple 11 and a metallic thermocouple 12 acting as an auxiliary thermocouple. The metallic thermocouple 12 is attached to the end of a rod 14 made from boron carbide ($B_4C$). The ceramic thermocouple 11 consists of a cylinder 13 made from graphite (C). The rod 14 is joined to the front end of the cylinder 13 and electrically connected with the cylinder 13 to form a hot junction (not shown). An annular electrode 15 made from pure copper is fitted over the base end of the cylinder 13 such that the rod 14 protrudes from the electrode 15. Another annular electrode 16 made from pure copper is fitted over the base end of the rod 14. Leads 17 and 18 made from pure copper extend from the electrodes 15 and 16, respectively. The base end of the cylinder 13 is externally threaded. The electrode 15 is internally threaded. The electrode 15 is screwed to the cylinder 13 to mount the electrode 15 on the cylinder 11. The electrode 16 is mounted on the rod 14 via a leaf spring (not shown). The front end of the metallic thermocouple 12 is burried in the electrode 16 to permit measurement of the temperature at the junction of the rod 14 of B₄C and the electrode 16 of pure copper. The thermo emf generated by the B₄C/C thermocouple is measured between the leads 17 and 18 extending from the electrodes 15 and 16. The novel B₄C/C thermocouple is principally used in a vacuum or in a protective atmosphere filled with inert gas. Therefore, when the novel thermocouple is attached to a material being examined, it is necessary to maintain the gas-tightness characteristic of the measuring environment. For this purpose, a mounting fixture that matches the mounting method is provided to facilitate the mounting. Cables are brought out from the mounting fixture made from pure copper, via hermetic terminals to take the thermo emf from the B₄C/C thermocouple and to provide cold junction compensation with the metallic thermocouple. The mounting fixture can also take the form of a flange.

The temperature of the hot junction is calculated from the emf produced by the composite B₄C/C thermocouple and from the thermal emf produced by the auxiliary thermocouple through the use of a converter which is hereinafter described. In the composite B₄C/C thermocouple, the net thermo emf produced by the B₄C/C thermocouple and the thermo emf produced by the auxiliary thermocouple are separately taken. In the conventional thermocouple using compensating lead wires, the thermo emf produced by the compensating lead wires is equal to the thermo emf generated by the body of the main thermocouple. Therefore, if the thermo emf set up between the ends of the compensating lead wires is measured by connecting the wires to the ends of the thermocouple, then the sum of the thermo emf produced by the body of the thermocouple and the thermo emf developed by the compensating lead wires is automatically taken. In this case, the total thermo emf can be directly converted into temperature simply by transforming the thermo emf detected between the ends of the compensating lead wires into temperature according to a translation table which is usually used to change the thermo emf generated by the body of the main thermo couple into temperature. However, in the novel composite thermocouple, the metallic thermocouple providing cold junction compensation differs in thermoelectromotive characteristic from the main thermocouple and so if the thermo emf produced by the metallic thermocouple is simply added to the thermo emf in the same manner as the prior art method, then no useful result is obtained. More specifically, before the thermo emf generated by the metal thermocouple is added, it must be converted into thermo emf produced by the main B₄C/C thermocouple. Consequently, the following three arithmetic operations are needed to calculate the temperature of the hot junction from the thermo emf produced by the novel composite thermocouple:

(1) Converting the thermo emf produced by the metal thermocouple into thermo emf of the main B₄C/C thermocouple.

(2) Adding the converted thermo emf to the thermo emf produced by the main B₄C/C thermocouple.

(3) Converting the total thermo emf into temperature according to a translation table which is normally used to change the thermo emf generated by the main thermocouple into temperature.

The arithmetic operation (1) needs an interpolation equation (1) which converts the thermo emf produced by the metallic thermocouple into thermo emf of the main B₄C/C thermocouple, the metallic thermocouple acting to provide cold junction compensation. The arithmetic operation (3) described above requires an interpolation equation (2) which converts the total thermo emf into temperature.

Interpolation equation (1) is found in the manner described below. Since the translation table for converting the thermo emf produced by the used auxiliary thermocouple into temperature is known, if the relationship between the emf generated by the main thermocouple and temperature in a low temperature range lower than about 300° C. where the cold junction compensation is made is known, then interpolation equation (1) can be found. This relationship is found as follows. Extension leads made from pure copper are connected to both cold junctions of the B₄C/C thermocouple. A measuring instrument is connected between the ends of the extension leads. The temperature at the hot junction of the thermocouple and the temperature at the cold junction of the B₄C leg are measured with a reference thermocouple. The difference between these two temperatures is taken as the temperature of the B₄C/C thermocouple. The temperature difference is changed in increments of 50° C. from 0° to about 1000° C. while maintaining the temperature at the cold junction of the B₄C leg constant. Whenever it is varied by 50° C., the thermo emf produced by the B₄C/C thermocouple is measured to obtain data about the relationship between the thermo emf set up by the B₄C/C thermocouple and temperature in the temperature range from 0° to 1000° C. Since the temperature range in which cold junction compensation is provided is about 300° C. at the highest, the data items contained in the range of 0° to 300° C. are extracted from the data contained in the temperature range of 0° to 1000° C., and then, unknown data items between the extracted data items are interpolated by the least squares method, wherein the translation table for converting the thermo emf into temperature is obtained.

A method for finding interpolation equation (2) is now described. Since the highest temperature of the B₄C/C thermocouple is 2200° C., when data concerning the relationship between thermo emf and temperature is collected, it is necessary to raise the temperature of the hot junction at least up to 2200° C. Accordingly, the calibrating thermocouple which measures the temperature of the hot junction of the B₄C/C thermocouple is required to measure temperature up to 2200° C. The thermocouple which can measure up to such high temperatures and has the widest acceptance is W/WRe thermocouple. However, a thermocouple of this kind differs in thermoelectromotive characteristic from another thermocouple by about 1%. In addition, the characteristic may drift during calibration. Therefore, in order to maintain the reproducibility of calibration, it is preferred to use a radiation pyrometer that has been calibrated by an official institution, such as the National Measurement Laboratory. In the present invention, to execute this method of calibration, a blackbody furnace having a known emissivity is used as a heat source, and a calibrated radiation pyrometer is employed. The temperature indicated by this pyrometer is used as a reference temperature. Also in this calibration, cold junction compensation is provided by the metallic thermocouple attached to the cold junction of the B₄C leg to make the calibration practical. This is preferable since the reproducibility is enhanced.

Figure 12:
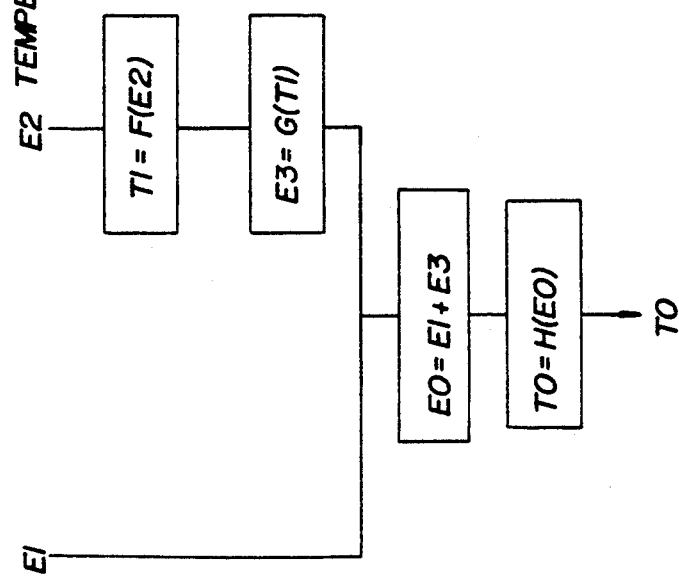
FIG. 12 is a flow sheet illustrating a sequence of arithmetic operations performed to calculate the temperature at the hot junction of the composite B₄C/C thermocouple from the thermo emf of the thermocouple.

Interpolation equations (1) and (2) are determined in the following manner. The temperature of the hot junction is calculated from the thermo emfs produced by the main thermocouple X and the auxiliary thermocouple Y of the novel composite ceramic, using interpolation equations (1) and (2) in accordance with the flow chart shown in FIG. 12. Let $E_1$ and $E_2$ be the thermo emfs developed by the main thermocouple X and the auxiliary thermocouple Y, respectively. Formulas (1), (2), (3), (4) are contained in the flow chart. When a metallic thermocouple of the K type is used, formula (1) is given by $$T_1 = F(E_2) = -0.03425 \cdot E_2^2 + 24.99 \cdot E_2 - 0.7670.$$

Generally, formulas (2), (3), (4) are respectively given by $$E_3 = G(T_1) = B_1 \cdot T_1^2 + B_2 \cdot T_1 + B_3;$$

$$E_0 = E_1 + E_3; \text{ and}$$

$$T_0 = H(E_0) = A_1 \cdot E_0^4 + A_2 \cdot E_0^3 + A_3 \cdot E_0^2 + A_4 \cdot E_0 + A_5$$

Formulas (1) and (2) correspond to the above-described interpolation equation (1). Formula (4) corresponds to interpolation equation (2).

For the conventional general-purpose metallic thermocouple, when compensating lead wires are connected with the body of the thermocouple, the thermo emf corresponding to the temperature of the cold junctions is automatically added. Also, the translation table for converting the thermo emf produced by the thermocouple into temperature is known. Therefore, a converter can be fabricated simply by establishing one known interpolation equation. As for the novel composite B₄C/C thermocouple and other ceramic thermocouples, their thermoelectromotive characteristics are not standardized. The relationship between thermo emf and temperature may differ among many of the manufactured thermocouples. In this case, if an invariable interpolation equation is incorporated in a converter, similar to the prior art converter, for converting thermo emf into temperature, and if a thermocouple having a different thermoelectromotive characteristic is used, then the measured temperature contains an error. Hence, the reliability of the measurement greatly deteriorates.

Figure 13:
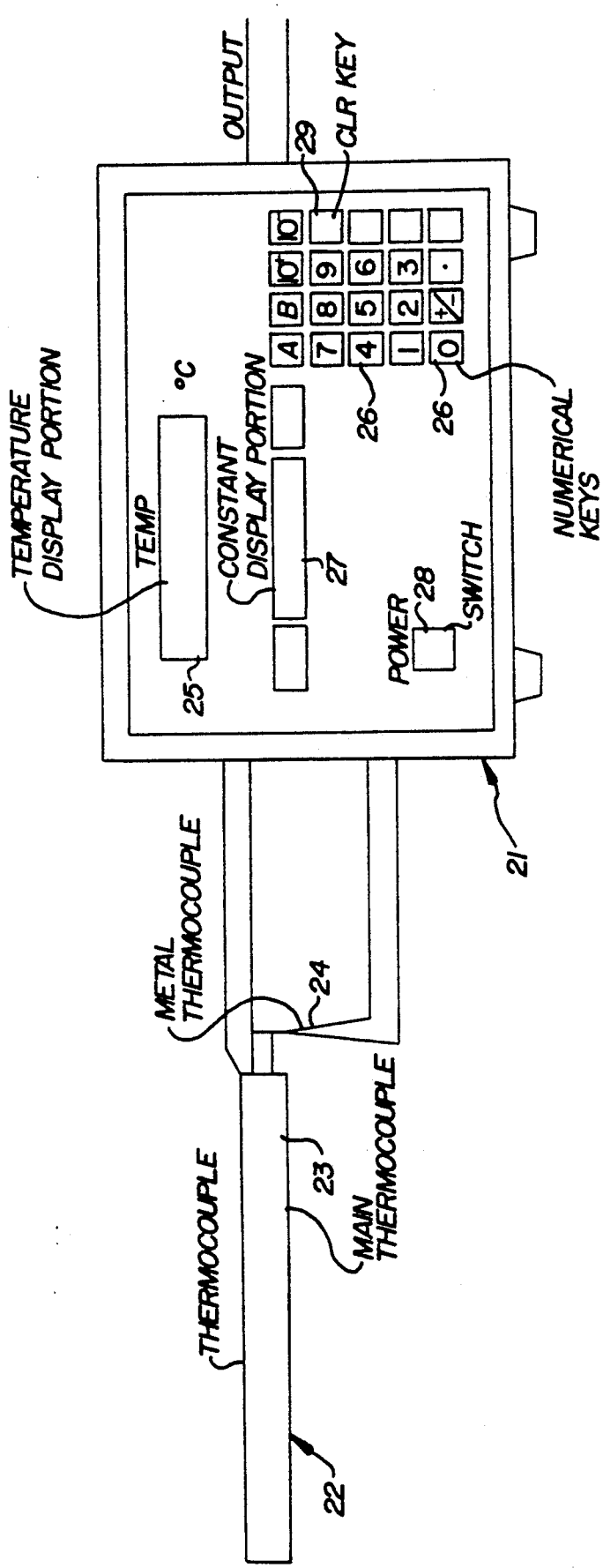
FIG. 13 is a front elevation of a converter according to the invention.

Accordingly, a converter for use with the novel composite ceramic thermocouple should be capable of appropriately setting the values of the constants $B_1$–$B_3$, $A_1$–$A_5$ to accommodate variation in characteristic among many of the manufactured products, the constants substantially determining interpolation equations (1) and (2). Accordingly, no converter has had such a capability. The present inventor has developed this converter. One example of the converter is shown in FIG. 13, where the converter is generally indicated by reference numeral 21. A composite B₄C/C thermocouple 22 has a main thermocouple 23 and a metal thermocouple 24 that provides cold junction compensation. The thermo emfs generated by the main thermocouple 23 and the metal thermocouple 24 are supplied to the converter 21 via leads made from pure copper. The converter 21 includes a temperature display portion 25 that provides digital display of the measured temperature. Numerical keys 26 are used to enter the values of the constants $A_1$–$A_3$, $B_1$14 $B_3$ which determine interpolation equations (1) and (2). The entered values of the constants are displayed on a constant value display portion 27. Also shown is a power switch 28. An adequate recorder may be connected with the converter 21. Also, a temperature controller which feeds the measured temperature back to the material under examination to control the temperature of the material may be installed.

The values of the constants included in the interpolation equations are entered by depressing the numerical keys 26 on the front panel. The entered values are modified or cleared by depressing a CLR key 29 disposed alongside of the numerical keys 26. The entered constants are stored in a memory in the form of an integrated circuit incorporated in the converter 21. Since the memory is backed up by a battery, the values of the constants are kept stored if the power supply is turned off. This converter enables constant values for determining interpolation equations (1) and (2) to be separately entered. Where thermoelectromotive characteristic differs among many of the manufactured composite ceramic thermocouples, a list of the constants $B_1$–$B_3$, $A_1$–$A_5$ characteristic of each individual thermocouple may be attached to each thermocouple supplied by the manufacturer. The user can always perform a precise measurement of temperature by entering the constants.

A method of measuring temperature using a composite ceramic thermocouple, especially a B₄C/C thermocouple, a composite ceramic thermocouple for carrying out the method, and a converter for use with the thermocouple have been described thus far. The invention can be applied to ceramic thermocouples other than the B₄C/C thermocouple and also to special thermocouples which have no compensating lead wires and wires of which have cold junctions that are not at the same temperature.

While the invention has been particularly shown and described in reference to preferred embodiments thereof, it will be understood by those skilled in the art that changes in form and details may be made therein without departing from the spirit and scope of the invention.

What is claimed is:

1. A converter for converting thermo emf of a composite thermocouple into temperature of a material being tested, the composite thermocouple comprising:
   a first thermocouple having cold junctions and having no compensating lead wires, and a second thermocouple having a known thermoelectromotive characteristic, the second thermocouple being an auxiliary thermocouple and compensates for the temperature of one of the cold junctions of the first thermocouple; and
   a means for independently setting a first interpolation equation and a second interpolation equation, the first interpolation equation being used to convert a thermo emf of the second thermocouple into a thermo emf of the first thermocouple, the second interpolation equation being used to convert a total thermo emf into temperature, the total thermo emf being a sum of the thermo emf of the first thermocouple and the converted thermo emf of the second thermocouple.

2. A method of calculating temperature of a hot junction of a composite thermocouple having a first thermocouple with cold junctions and a second thermocouple with a known thermoelectromotive characteristic and connected to one of the cold junctions of the first thermocouple for providing cold junction compensation, the second thermocouple being an auxiliary thermocouple, the method comprising the steps of:

converting a thermo emf produced by the second thermocouple into temperature to determine the temperature of the cold junctions;

converting a thermo emf of the first thermocouple corresponding to the temperature of the cold junctions into temperature with the use of a translation table, the resultant value being a thermo emf generated by the cold junction compensation;

adding the thermo emf generated by the cold junction compensation to the thermo emf of the first thermocouple; and converting a resultant total thermo emf into temperature with the use of the translation table for converting the thermo emf of the first thermocouple into temperature to calculate the temperature of the hot junction of the first thermocouple.

3. The method of claim 2, wherein the step of converting the thermo emf of the main thermocouple into temperature with the use of the translation table includes the step of using a translation table which is divided into two parts for a whole temperature range in which the first thermocouple measures temperature and a low temperature range and in which the second thermocouple provides cold junction compensation.

* * * * *

UNITED STATES PATENT AND TRADEMARK OFFICE
CERTIFICATE OF CORRECTION

PATENT NO. : 5,038,303
DATED : August 6, 1991
INVENTOR(S) : Hideo KIMURA

It is certified that error appears in the above-identified patent and that said Letters Patent is hereby corrected as shown below:

On the cover page, Item [62], "August 28, 1988" should read -- August 25, 1988 --.

Signed and Sealed this

Sixth Day of April, 1993

Attest:

STEPHEN G. KUNIN

*Attesting Officer*  *Acting Commissioner of Patents and Trademarks*